INVENTOR.
HARRY V. MILES

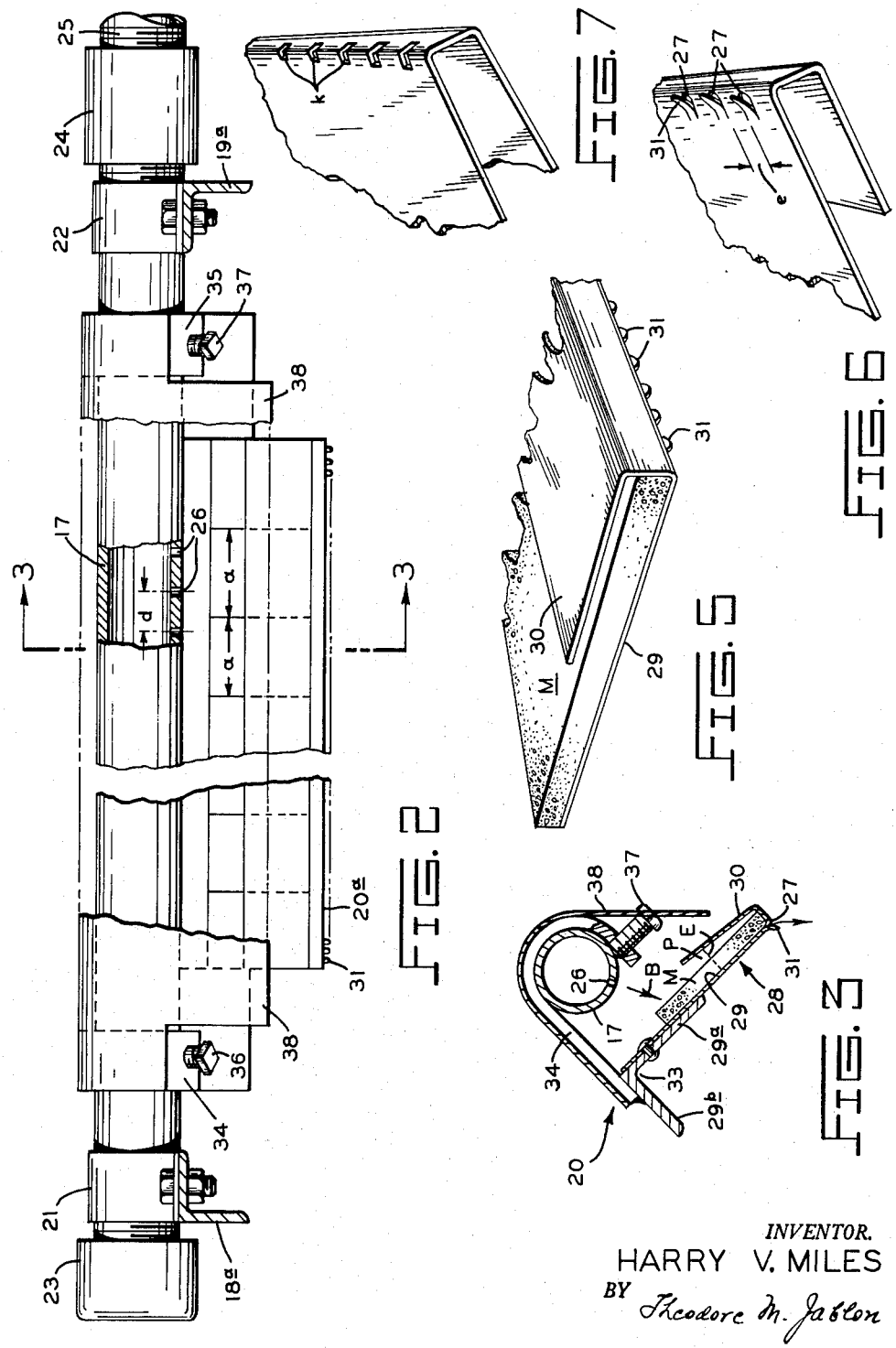

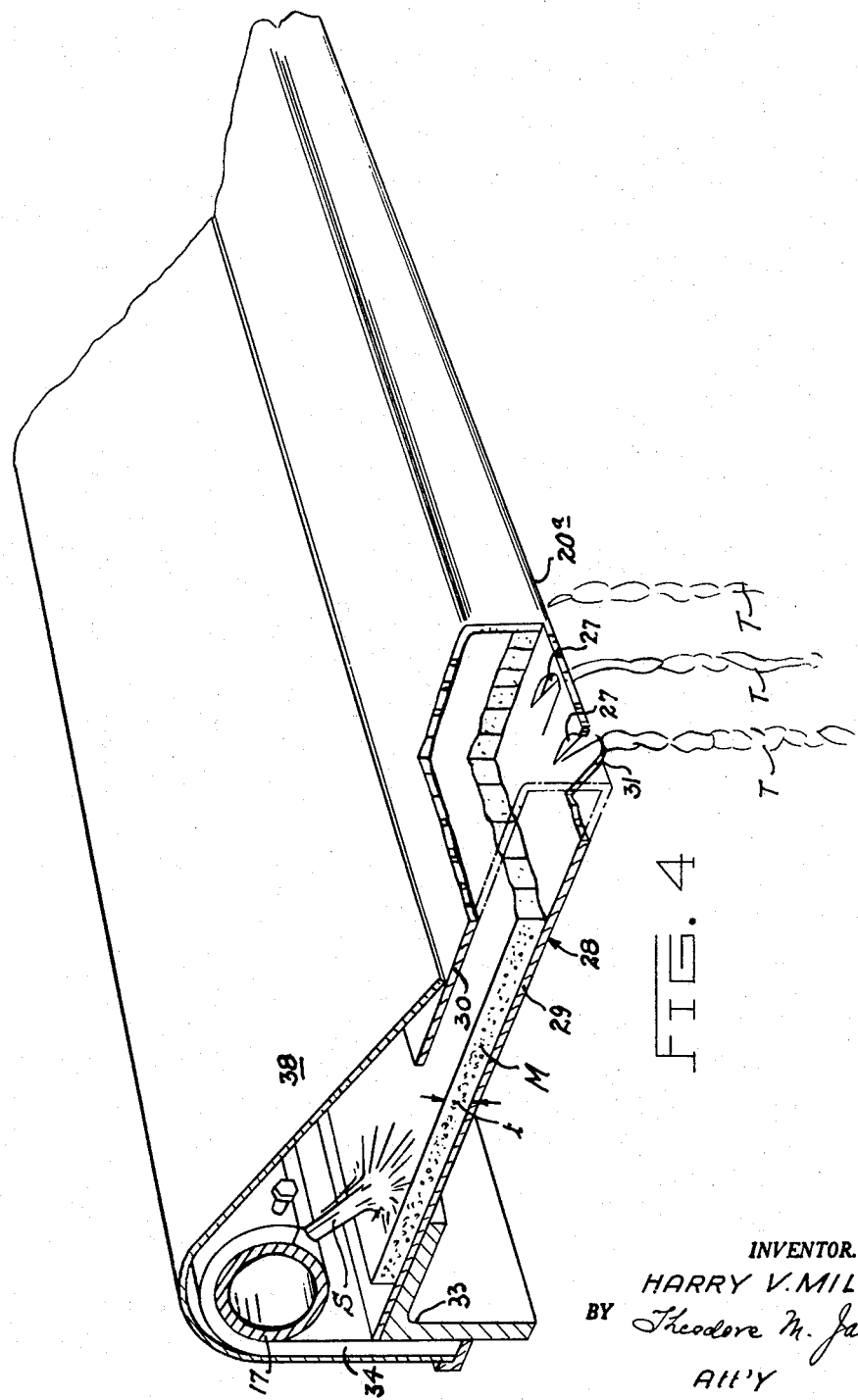

Nov. 2, 1965 H. V. MILES, JR 3,215,277
CONTINUOUS FILTERS
Filed Sept. 24, 1963 4 Sheets-Sheet 4

INVENTOR.
HARRY V. MILES Jr.
BY *Theodore M. Jablon*
ATTORNEY.

United States Patent Office 3,215,277
Patented Nov. 2, 1965

3,215,277
CONTINUOUS FILTERS
Harry V. Miles, Jr., Westport, Conn., assignor to Dorr-Oliver Incorporated, Stamford, Conn., a corporation of Delaware
Filed Sept. 24, 1963, Ser. No. 312,824
9 Claims. (Cl. 210—217)

This is a continuation-in-part of my application Serial No. 92,408 filed February 28, 1961 and now abandoned.

This invention relates to continuously operating filters, and more particularly to improvements in the liquid distributing devices whereby wash or treatment liquid is applied to the filter cake moving continuously to a point of cake discharge, and where uniformity of application of the liquid to the filter cake and effectiveness have been a problem.

For example, the invention is applicable to various continuous filter types, such as rotary drum filters, traveling belt filters, as well as others, for a variety of filtration operations involving various materials, in conjunction with various kinds of washing operations. An example is provided in a rotary drum filter unit such as may be used in the filtration of so-called cane mud derived as underflow from a cane sugar juice clarification operation where the filter cake is washed for the recovery of residual sugar value in the cake, which example may hereinafter serve for the purposes of illustrating the invention.

Earlier wash liquid distributing devices have not been wholly satisfactory as measured by the purposes of this invention, namely for lack of uniformity of liquid distribution over the width of the filter cake, washing effectiveness, and also because of their structural complications as well as costs, or because of a combination of any of these factors. For example, in the field it is almost impossible to install a wash distributor for a filter drum of considerable length without some deviation from the horizontal, necessitating the use of special weir devices. Hence, a uniform distribution has heretofore rarely been achieved. Among the earlier devices are stationary spray nozzle arrangements, as well as those that aim to obtain uniformity of liquid distribution by means of special weir devices or by mechanically reciprocating the liquid issuing devices in a direction transversely of the moving cake, all of which means are costly yet not satisfactory from the point of view of the invention.

Hence, one object of this invention is to provide improved simple and effective as well as low cost wash liquid distributing devices, preferably readily applicable to conventional continuous filter units, whereby the liquid is applied as a uniform curtain of water across the width of the filter cake so that as a result a uniform and complete recovery of the residual value from the filter cake may be made without incurring the drawbacks of any of the aforementioned earlier wash distributing devices, and which improved arrangement is relatively immune to deviations from the horizontal.

A more specific object is to provide improved liquid distributing devices not only meeting the foregoing general requirements, but also capable of delivering the liquid in a multitude of equal separate streams so closely spaced from one another across the width of the traveling cake, that a uniform washing effect is thereby attainable even across the width for instance of filter drums having 8 to 12 feet and even greater axial length.

Accordingly, the invention provides a primary liquid supply zone or transverse conduit means extending across the width of the moving filter cake or layer of material, for delivering one or more primary streams of the liquid, combined with secondary flow distributing means for receiving and uniformly redistributing the liquid of the primary streams by converting them into the aforementioned multitude or transverse row of closely spaced substantially equal secondary streams discharging onto the moving filter cake or layer of material to be washed.

The aforementioned primary streams of the wash liquid, according to the invention, issue onto a liquid-pervious flow equalizing or liquid dispersing material provided in the secondary or redistributing zone of the device, this material being located directly adjoining a row of secondary discharge orifices or points of discharge. This material acts to distribute the water uniformly to a row of closely spaced orifices or the like at a lower level. Substantially, the equalizing effect of this material is such as to provide a uniform head over the lower orifices discharging the wash water or the like in closely spaced streams. Uniform liquid redistribution is thus attainable irrespective of deviations from the horizontal of the primary conduit means or other inequalities of structure affecting the uniformity of distribution, such as was the problem with the prior art devices.

The device comprises a generally horizontally extending liquid distributing member, preferably a transverse inclined tray structure for receiving the primary streams and having the aforementioned secondary orifices. This inclined tray structure may be formed with a receiving pocket horizontally along the bottom, wherein the equalizing material may be partially enclosed.

One feature concerning the delivery and formation of the secondary streams lies in the provision of directional means, for instance tongue portions formed in the bottom of the transverse receiving structure or formations having the effect of chutes or spouts, which allow for close spacing of the streams while maintaining them separated from each other.

Other features and advantages will hereinafter appear.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

FIG. 2 is an enlarged detail sectional view taken on line 2—2 in FIG. 1, showing a side view of one of the distributing devices, as viewed from the discharge side of the receiving tray structure;

FIG. 3 is a cross-sectional detail view of the device taken on line 3—3 in FIG. 2, showing more clearly the relationship between the primary and the secondary liquid streams;

FIG. 4 is a greatly enlarged cross-sectional perspective view of the device taken on line 3—3 of FIG. 2;

FIG. 5 is a fragmentary detail perspective view of one form of the liquid receiving tray structure, featuring special secondary liquid discharge orifices;

FIG. 6 is an upside-down fragmentary perspective view of the tray structure of FIG. 5, more clearly showing the secondary discharge orifices;

FIG. 7 shows a liquid receiving tray structure similar to FIG. 6, although with differently constructed secondary discharge orifices;

Figure 1:
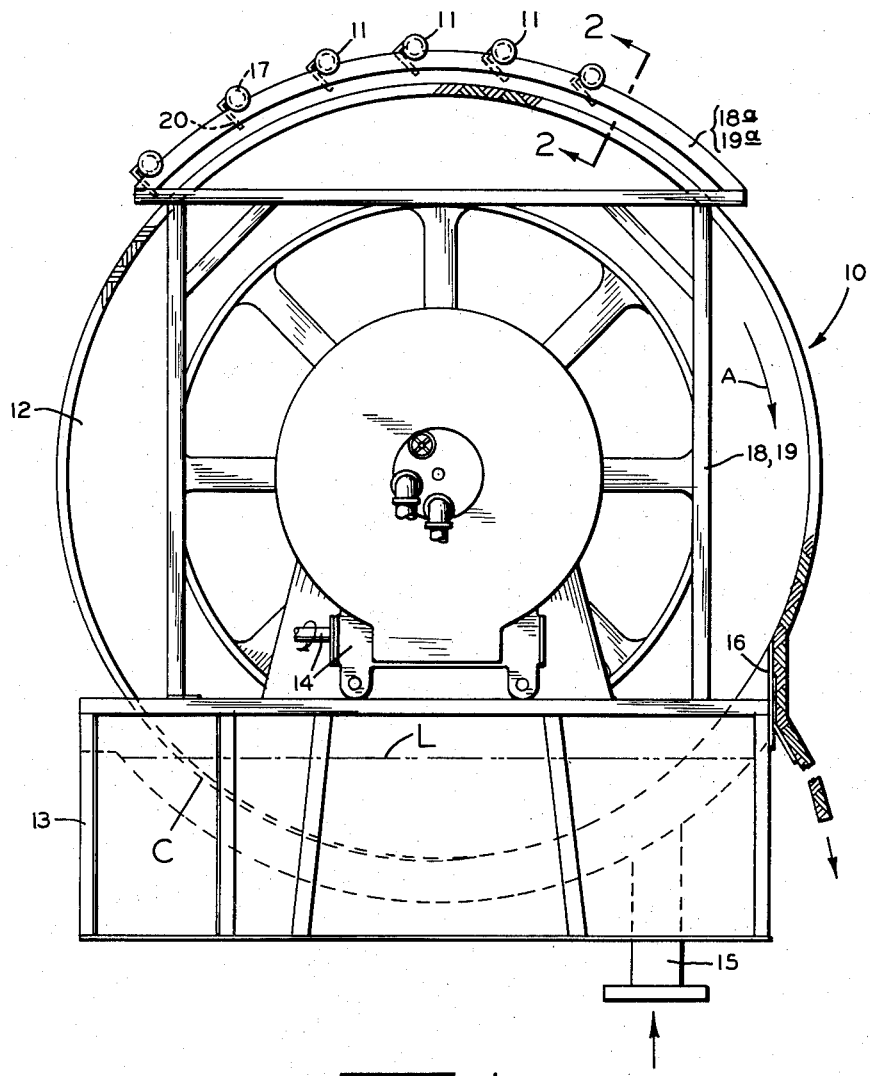
FIG. 1 is a diagrammatic end view of one embodiment of the liquid distributing device of this invention in plural arrangement as applied to a conventional drum filter unit.

In an example of the invention illustrated in FIG. 1, there is presented a simplified and somewhat diagrammatic end view of a conventional rotary continuous drum filter unit 10 combined with one form of the wash liquid distributing devices of this invention as represented by a plurality of novel liquid distributing units 11 supported side by side spaced relative to one another as well as relative to the surface of the top zone of the filter drum.

The continuous filter unit 10 may be assumed to be equipped with the usual filter appurtenances, and it may be constructed and operated in accordane with a well known filter operating cycle effective incident to the rotation of the filter drum.

Hence, the filter unit comprises a filter drum 12 supported for rotation on a vat 13 with worm drive 14 for effecting the rotation of the drum as in a clockwise direction shown by arrow A. The filter drum equipped with a suitable filter media or the like is partially immersed into a bath of pulp or slurry maintained in the vat at the pulp level L for filtration, with the slurry supplied through the bottom feed connection 15.

In the operating cycle, as the drum rotates in the clockwise direction shown, a filter cake "C" forms on the drum at the underside thereof due to vacuum applied interiorly of the drum whereby filtrate is drawn from the interior of the drum. Vacuum continues to act on the filter cake at the ascending side of the drum removing residual strong solution from the cake. As the vacuum continues, the balance of residual solution or soluble values is then removed from the cake by the wash liquid applied thereto in the washing zone at the top of the drum, by way of the improved liquid distributing units 11 of this invention, resulting in a weak solution filtrate containing further values. Then, at the descending side of the drum residual wash water is drawn by the vacuum from the cake. The cake material on the drum then passes through a neutral zone with vacuum interrupted, to allow the leached out filter cake to be removed from the drum as indicated by the operation of a doctor blade 16 or the like.

Suitably, five or six of the novel wash liquid distributor units 11 may be arranged in the washing zone of the drum as diagrammatically indicated in FIG. 1, where each of these units as herein exemplified comprises a horizontal liquid supply pipe 17 endwise mounted upon respective supporting frame structures 18 and 19 rising from respective ends of the filter vat, and having arcuate transverse supporting members 18a and 19a to which the respective ends of the pipe are fastened. Each pipe 17 in turn supports a shelf-like novel liquid distributing construction 20 the details, mounting and function of which will be presently described by reference to the enlarged detail FIGURES 2, 3, and 4.

Accordingly (see FIG. 1), clamping members 21 and 22 hold the ends of pipe 17 of each distributor unit fastened to the respective arcuate members 18a and 19a of the upright supporting frames, one end of the pipe being closed as by screw cap 23, the other end being connected as by nipple or threaded coupling member 24 or the like to a water supply means 25.

Supply pipe 17 is held or fixed by the clamps in such a position that discharge openings 26 therein are pointed substantially downwardly in a direction indicated as by arrow B (see FIG. 3) representing primary streams "S" (see FIG. 4) of the wash liquid or the like, which primary streams are suitably spaced from one another as by a distance "d" (see FIG. 2) substantially greater than the spacing "e" (see FIG. 6) noted between secondary discharge orifices 27 provided in a row along the horizontal discharge edge 20a of the aforementioned distributing construction 20 for delivering the secondary streams "T" of wash liquid onto the filter cake.

The secondary distributing means or construction 20 comprises a shelf-like downwardly inclined receiving structure or distributing member 28 extending tranversely across the filter cake, preferably made of suitable sheet material for example aluminum wherein the secondary discharge orifices 27 are conveniently provided as by stamping. In the example of FIGS. 2 and 3, the inclined receiving structure 28 is of U-shaped cross-sectional configuration with a long shank 29 thereof constituting an inclined discharge plate or bottom portion of the receiving structure while the short shank 30 of the U-shape provides a backward overhang relative to the bottom portion. This transverse receiving structure thus constitutes an inclined pocket "P" for the reception therein of a pervious flow-equalizing or liquid distributing medium or material M preferably in the form of a sheet, slab, or mat, the characteristics and the nature and function of which will be further described below. Whereas this material may be provided in the form of a single strip, it is herein shown to be arranged in sections (see FIG. 2) with "a" designating the individual widths thereof.

The aforementioned closely spaced secondary discharge orifices 27 are provided along the horizontal lower or discharge edge of the receiving structure, which orifices are formed for instance by partially stamped out downwardly directed tongues 31 such as indicated in FIGS. 2 and 3 and further clearly illustrated in the fragmentary detail FIG. 6. By the provision of these tongues 31 formed directly from the sheet material of the discharge plate, directional effects are imparted to the secondary streams, thereby in turn permitting a relatively close spacing of the orifices.

The inclined discharge plate is fastened to a tie member or support member 33 preferably of angular profile with its apex pointing upwardly. As shown in FIG. 3, the discharge plate is fastened or riveted to the outer face of shank 29a of the profiled support member, while a pair of hook shaped bracket members 34 and 35 are fastened as by welding to the outer face of the other shank 29b of the profiled member. The bent or curved upper end portions of the bracket members fit over pipe 17 and carry respective set screws 36 and 37 for fixing the secondary or redistributing construction 20 adjustably in any desired angular position relative to the axis of the pipe, whereby the inclination of the discharge plate is made adjustable. Intermediate support may be provided for the pipe.

Referring now to the aforementioned pervious equalizing medium "M," according to one embodiment of the invention, a sheet, slab, or mat of such material is placed upon the discharge plate and into pocket "P" of the receiving structure, with the lower transverse edge of the material directly adjoining the secondary discharge orifices 27, enabling the porous system or the like of the equalizing medium to communicate directly with these orifices. Equalizing media of various kinds may be employed, for example of porous or of fibrous character. A suitable porous material for the purposes of this invention is capable of being readily saturated with water falling on its surface, and of allowing the passage therethrough of water against a capillarity or functional resistance. Furthermore, this capillarity or resistance of this equalizing medium to the flow of water should be such that the water will not discharge from the medium too fast or faster than the influent rate, even though the frictional resistance to the flow therethrough is suitably of such a low order that a maximum flow of liquid can be achieved therethrough with the material itself preferably kept in non-submerged condition. Under such conditions, a residual quantity of the liquid is detained in the interstices or pores of the equalizing material during operation, occupying at least the lower transverse end portion of the volume of the material adjoining the orifices. Therefore, an all around suitable porous material for the purposes of this invention is one having high void volume, a specific pore structure, a resistance to physical degradation at certain temperatures, and also having chemical resistance.

One suitable example of a material meeting these requirements was found in the form of polyurethane foam, for example in the form of slabs or sheets, known as Scott foam and produced by the Scott Paper Company. This material has a void volume of above 90% and is resistant to the action of many chemicals. Also, it is suitable for continuous operation at liquid temperatures up to about 150° F. This is a flexible spongy material available in slabs of many different thicknesses as well as with various pore sizes. However, a grade having 60 pores per inch was most efficient for the invention as applied to the initially mentioned cane mud filtering operation. The throughflow capacity obtainable with this material is a function of the thickness "$t$" of this foam material, as well as of the size of the discharge orifices, assuming the pipe 17 provides the necessary flow. In the instance of the cane filter operation a ¼" thickness of this porous foam material was found to have adequate capacity when the discharge orifices 27 were spaced three to an inch and the orifices or tongues 31 ⅛" wide. The drilled holes or orifices 26 in pipe 17 having ⅛ inch diameter were spaced 3 inches center to center. A practical range of flow rates was from about 0.4 g.p.m. to about 1 g.p.m. per lineal foot. While the aforementioned porous foam material can be saturated with water, when dry it tends to resist the initial wetting. To facilitate wetting the material at start-up after complete drying has occurred, the material is partially enclosed in the pocket "P" formed by the receiving structure 23, to prevent run-off while forcing the water to flow through the porous medium in the initial wetting operation.

Thus, when the equalizing media is employed under the conditions of this invention, the improved distributing unit is immune to deviations from the horizontal, allowing the row of discharge orifices to be tilted to an angle in a range of about 5° to 10° relative to the horizontal without significantly affecting the uniformity of discharge of the water through the orifices.

Examples of flow equalizing sheet materials for the liquid distributing device of this invention are illustrated in FIGS. 10 to 13.

Figure 10:
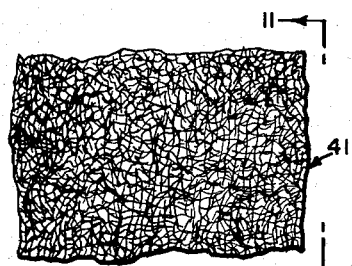
FIGS. 10 to 13 illustrate other flow equalizing sheet materials.
Figure 11:

In FIGS. 10 and 11, for instance, the material is a fabric type or cloth material in the nature of a felt. An example of such material having relatively high absorptiveness as well as permeability is a needled Dacron felt, for example, having a thickness of .055 inch, fiber denier 14, weight per sq. yard 8 oz., and Frazier porosity 230–280 cu. ft. per min. per sq. ft. per 0.5 inch $H_2O$ pressure drop, American Felt Co., Glenville, Connecticut.

Figure 12:
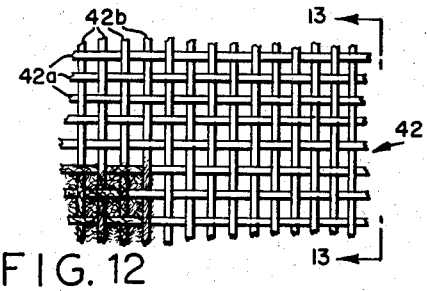
Figure 13:
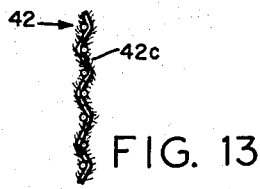

In FIGS. 12 and 13, the cloth material is in the nature of a weave, wherein the threads of the woof 42a and of the weft 42b are shown to have a fuzz 42c, which weave material has characteristics of absorptiveness and permeability suitable for the purposes of this invention. This material acts in substantially the same manner as the porous material described above in that it retards the flow of liquid traversing it and acts as a flow equalizing medium.

At any rate, in order to provide the desired distributing effect, the lower horizontal terminal edge of this slab or mat or sheet of equalizing material should extend along the row of secondary discharge orifices located in the lowermost portion along the horizontal discharge edge of the discharge plate or shelf. The secondary orifices themselves may be of various shapes, for example in the form of the slot like three-dimensional corner openings "$k$" illustrated in the detail FIG. 7. With a coating of hydrophobic material provided on the discharge plate or tray structure, the spacing between these openings may be minimized. An example of a water repellent agent is vinyl aluminum laminate. Improved directional effects can be imparted to the secondary liquid streams by the preparation of the discharge plate in such a manner that partially stamped-out portions of the plate are formed providing the aforementioned tongue portions 31, tending to maintain those streams separate from one another even though they may be closely spaced.

Figure 8:
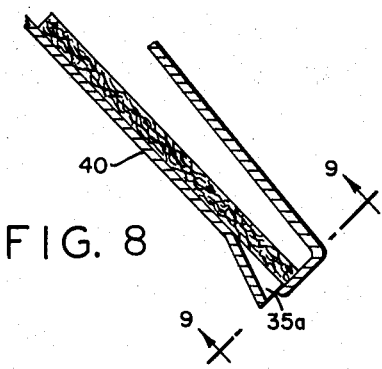
FIGS. 8 and 9 show the liquid receiving tray structure with differently shaped secondary discharge openings.
Figure 9:
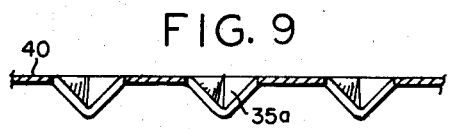

Furthermore, in the embodiment of the liquid distributing member or tray structure 40 of FIGS. 8 and 9, the secondary discharge openings 35a are in the form of chutes having the effect of spouts.

Practical significance is attached to the aforesaid pocket "P" (see FIG. 3) formed by the transverse receiving structure 28 and partially enclosing the equalizing medium "M." This pocket serves to prevent run-off of wash water not immediately absorbed by the medium, as when starting with the equalizing material in a dry condition. The run-off is prevented by the end walls "E" (see FIG. 3) of such a pocket.

It has been found that the equalizing material employed in accordance with the teachings of this invention provides effective redistribution of the wash liquid or the like, irrespective of structural deviations of the distributing device from the horizontal. The result is that the large number of secondary orifices will receive substantially equal shares of the wash liquid for discharging substantially equal secondary streams of wash water onto the moving filter cake.

Wash water may be applied to the equalizing medium "M" by means other than the openings 26 in the supply pipe 17, in that for example shower heads or similar devices may be employed to spray the water onto the equalizing medium.

Finally, a cover shield or inverted channel member 38 is placed loosely resting over the pipe 17, shaped so as to partially overlie the receiving structure 20 and particularly the overhang 30 thereof. While readily removable this cover member protects the redistributing zone against the accumulations of dirt or the like thereon. Also, this shield avoids splashing of liquid onto the filter cake and the surrounding areas, this shield being especially useful where hot or corrosive liquids may be used for washing or for treating the filter cake or the like.

From the foregoing, it will be seen that the invention provides an extremely simple as well as inexpensive filter cake washing device of great compactness and readily applicable to the filter units, based upon the concept that the wash liquid be applied to the filter cake from a row of closely spaced orifices to which the wash liquid is uniformly distributed by the equalizing medium. In a suitable arrangement attaining the object of the invention, the secondary discharge orifices are provided by tongue portions, chutes or spouts enabling close spacing of the orifices.

Briefly, the invention provides a simple, effective, compact, and low cost device for obtaining a curtain discharge of water in uniform distribution over the width of the filter cake, without the need of weirs or spray nozzle systems or other complicated mechanism, and without requiring the distributing device to be perfectly level between its ends.

It will be understood that each of the elements described above, or two or more together may also find useful application in other types of material treatment units differing from those described above.

Furthermore, while the invention has been illustrated and described as embodied in a cake washing device for continuously operating filter units, it is not limited to the details shown, since various modifications and structural changes may be made without departing from the spirit of this invention.

I claim:

1. In a continuous filter having a travelling filter means and a liquid distributing means spaced upwardly from the filter means for applying wash liquid to the filter means, the improvement which comprises an elongate generally horizontal liquid distributing member having a body portion presenting an inclined face and having an upwardly turned lower edge portion constituting with said inclined face a pocket, and having a horizontal row of discharge openings along the lower end thereof and closely spaced relative to one another, a layer of flow retardant liquid dispersing material provided on said inclined face and in said pocket and having a bottom edge portion extending horizontally adjacent to said row of openings, and liquid supply means spaced upwardly from said inclined face and from said layer of material, said supply means comprising horizontal conduit means extending substantially throughout the length of said liquid distributing member and having discharge openings spaced along the length thereof, whereby liquid from said supply means traverses said layer of liquid dispersing material before reaching said discharge openings, said liquid dispersing material serving to evenly distribute liquid from said supply means to said openings.

2. Apparatus according to claim 1, wherein said distributing member consists of a relatively thin sheet material, and said discharge openings are formed by stamped-out downwardly directed tongues.

3. Apparatus according to claim 2, provided with means for adjusting the inclination of said body portion.

4. Apparatus according to claim 2, wherein said liquid supply means comprise a horizontal pipe having discharge openings distributed along the length thereof, and bracket means are provided supporting said distributing member from said horizontal pipe in spaced relationship therewith, and means for adjustably securing said bracket means to said pipe to allow for angular adjustment of said bracket means together with said distributing member about the axis of said pipe.

5. Apparatus according to claim 2, wherein said liquid supply means comprise a horizontal pipe having discharge openings spaced along the length thereof, and wherein means are provided for mounting said distributing member so as to be supported from said pipe, comprising a horizontal tie member fixed to the upper end of said distributing member extending substantially along the length thereof, and bracket means fixed to said tie member and shaped to engage at least partially around said pipe.

6. Apparatus according to claim 2, wherein said liquid supply means comprise a horizontal pipe having discharge openings spaced along the length thereof, and wherein means are provided for mounting said distributing member so as to be supported from said pipe, comprising a horizontal tie member of angle profile arranged with the apex pointing upwardly and with one shank of the angle profile fixed to the upper end portion of said distributing member, and bracket means fixed to the other shank of said angle profile and shaped to engage at least partially around said pipe.

7. Apparatus according to claim 2, wherein said liquid supply means comprise a horizontal pipe, wherein said upwardly turned lower edge portion of the distributing member is bent backwardly upon said body portion to constitute therewith a horizontally extending groove, wherein bracket means are provided for supporting said distributing member in spaced relationship from said pipe, and wherein a shield member is provided shaped like an inverted trough removably overlying said pipe and said bracket means as well as overlying at least partially said backwardly bent portion.

8. Apparatus according to claim 2, wherein said dispersing material is in the form of a slab of porous material.

9. Apparatus according to claim 2, wherein said dispersing material is in the form of a slab of porous foam material.

References Cited by the Examiner

UNITED STATES PATENTS

| | | | |
|---|---|---|---|
| 447,942 | 3/91 | Collins | 239—42 X |
| 1,280,439 | 10/18 | Genter | 210—66 |
| 2,115,211 | 4/38 | Overbough | 210—66 X |
| 2,484,304 | 10/49 | Long et al. | 210—66 X |
| 2,798,768 | 7/57 | Babin | 239—145 |
| 2,943,378 | 7/60 | Harkenrider et al. | 239—145 X |
| 3,075,750 | 1/63 | Goettl | 261—97 |
| 3,083,952 | 4/63 | Goodloe et al. | 261—99 |

REUBEN FRIEDMAN, *Primary Examiner.*